2,991,171
GERMANIUM CONCENTRATION AND PRODUCTION

Francis P. Sinn, Montclair, and Clarence K. Conard, Montville, N.J., assignors to American Metal Climax, Inc., a corporation of New York
No Drawing. Continuation of application Ser. No. 342,274, Mar. 13, 1953. This application July 2, 1958, Ser. No. 746,096
8 Claims. (Cl. 75—1)

This invention relates to the concentration of germanium values in minerals for the recovery of germanium as product.

While germanium is widely distributed in nature, it is usually found in minerals which are very rare or in more abundant minerals in very small amounts. Thus, it is reported that the germanium content of germanite from Tsumeb, South-West Africa, averages about 5% by weight but zinc blendes of the United States, such as those from Joplin and Wisconsin, show only about 0.01% by weight of germanium. At present the element is recovered in this country as a by-product incidental to the smelting of zinc. For instance, it may be extracted from the dust collected from the sintering operation; this is not efficient and a considerable portion of the germanium remains with the finished sinter. Abroad, the element is obtained from flue dusts from coal burning and producer gas operations by a smelting process which is relatively expensive.

The growing uses of germanium have made it evident that there is serious need for a commercially feasible process for recovering germanium from minerals having very small contents of this element. Processes for the extraction of germanium from minerals have received considerable attention and are in a well developed state but these processes cannot be operated on a commercial basis with minerals of very low germanium content. Usually, heretofore the mineral had to contain more than 0.1 or 0.2% by weight of germanium to make recovery economically practical.

Accordingly, a principal object of this invention is to provide a process for concentrating the germanium values in minerals to furnish mineral concentrates from which the germanium may be more easily and economically extracted; thus, lower grade minerals may be successfully processed for germanium recovery.

Other objects and advantages of the invention will be apparent from the description which follows.

In accordance with this invention, a finely divided mineral containing germanium is conditioned to make its iron content, which may have been originally present in the mineral or may have been supplemented by adding the element substantially uniformly to the mineral, responsive to a magnetic field. Thus, where iron sulfide or carbonate is present in or is added to the mineral, the mineral may be subjected to roasting conditions to form magnetically responsive iron oxide; if desired, the roasted mineral may be treated in a reducing atmosphere to enhance the response of its iron content to a magnetic field. Where iron is added to a germaniferous mineral, it is essential not only that the addition be substantially uniform to the mass of comminuted mineral but also that the mixture be exposed to high temperature. Apparently, at high temperature, the germanium in the mineral migrates into the added iron, particularly when the iron is at least partially reduced. As already stated, the finely divided mineral containing germanium is conditioned at high temperature to make its original iron content or its iron content by addition responsive to a magnetic field. During the treatment at high temperature, the mineral is not transformed to a molten or liquid mass and, consequently, the mineral remains in a comminuted or finely divided state during as well as after the thermal treatment. To complete the germanium concentration process of this invention, the finely divided mineral is subjected to magnetic separation after it has been conditioned to make its iron content magnetically responsive. The magnetic mineral fraction is found to have an appreciably higher content of germanium than the original germanium content of the mineral. In short, the concentration process is predicated on the discovery that the germanium in a mineral may be caused to become preferentially associated with a magnetic fraction thereof.

A most fertile source of germanium is zinc blendes, particularly in view of the large tonnage of blendes processed in the production of zinc. This invention is especially well adapted for concentrating the germanium values, when present, in these abundant zinc ores. Specifically, when such a zinc blende is roasted to convert zinc sulfide to zinc oxide and the roasted material is then retorted with a reducing agent, usually carbon, to distill off the zinc, the bulk of the germanium originally present in the zinc ore will be found in the retort residue; however, the germanium in such a retort residue will rarely be as high as 0.2% by weight. Iron is always present in zinc ores and like germanium collects in the retort residue. The retort residue, preferably when it has been further comminuted, say to ensure that all particles go through a 20-mesh screen, is passed through any well-known magnetic separator, and the major portion of the germanium in the total residue is recoverable from the magnetic fraction. For instance, a zinc retort residue containing about 0.2% by weight of germanium was divided with the aid of a magnetic field into a non-magnetic fraction having a germanium content of 0.08% by weight and a magnetic fraction having a germanium content of 0.6% by weight. Nearly 80% of the germanium was thus concentrated in the magnetic fraction of the retort residue. The effectiveness of magnetic separation in the concentration of germanium is more readily appreciated when it is noted that the magnetic fraction is on a weight basis generally less than one-half of the retort residue and frequently less than one-third.

The magnetic concentration of germanium in zinc retort residues appears to function well when the iron content of the residues is of the order of 5% by weight and higher. Where the material charged to the retort yields a residue too low in iron content to permit satisfactory concentration of the germanium in a magnetic fraction, iron may be added to the retort charge before retorting. The added iron which may be in its elemental form or as a compound, desirably iron oxide, is uniformly admixed with the material charged to the retort. As a general rule, the addition of iron is limited to the extent that the residue in the retort will ultimately have an iron content not exceeding about 10% by weight because higher iron contents are deleterious to retorts and, in the final analysis, iron is a diluent of the germanium which is being concentrated.

It has also been found that the low concentration of germanium in the non-magnetic fraction of the retort residue may be substantially recovered by adding or recycling the non-magnetic fraction to the material charged to the retort in the next cycle of operation. The bulk of the germanium in the recycled non-magnetic residue fraction appears to accumulate in the magnetic fraction of the newly formed retort residue. Thus, the recycling of non-magnetic residue fractions greatly minimizes the loss of germanium.

In place of zinc oxide obtained by calcining and sintering blende, retorts are often charged with crude zinc oxide recovered as a by-product of lead smelting operations. The retort residue resulting from the reduction of such a crude zinc oxide containing germanium can also be divided pursuant to this invention to yield a magnetic fraction containing the major portion of all the germanium present in the total residue. Similarly, the process of the invention finds valuable application in the concentration of germanium in flue dusts and ashes derived from germaniferous coals. While such flue dusts and ashes usually contain an appreciable amount of iron so that the addition of iron thereto is not required, exposure of these materials to a reducing atmosphere to make the iron content more responsive to a magnetic field may be a beneficial pretreatment preceding the magnetic separation of the fraction rich in germanium.

The extraction of germanium from the magnetic concentrates obtained by the process of this invention is easily and economically accomplished by any of the known procedures.

In an illustrative example of the invention, 18,000 pounds of zinc oxide containing 0.024% by weight of germanium was conventionally retorted to recover zinc metal therefrom. The residue (2400 pounds) in the retort had a germanium content of 0.18% by weight. The cooled retort residue was ground to ensure that it would all pass through a 20-mesh screen and in this finely divided form was put through a magnetic separator. The non-magnetic fraction coresponding to 78.7% by weight of the total residue had a germanium content of 0.062% by weight while the magnetic fraction contained 0.63% by weight of germanium. To conserve the germanium in the non-magnetic residue fraction, this fraction was recycled to the zinc retort for processing with the next charge of zinc oxide. The magnetic fraction thus obtained is a germanium concentrate readily amenable to known processes for the recovery of the pure element.

The retorting of oxidic zinc minerals for the recovery of zinc is conventionally carried out by admixing the zinc mineral in comminuted form with reducing carbon and heating the admixture of mineral and carbon in the retort, and good operating practice demands such control of the retorting cycle as will ensure the mineral charge in the retort to remain throughout the retorting operation as a solid in comminuted form so that when the retorting cycle is ended the solid residue may be readily withdrawn from the retort.

This application is a continuation of copending application Serial No. 342,274, filed March 13, 1953, now abandoned.

In view of the various modifications of the invention which will occur to those skilled in the art upon consideration of the foregoing disclosure without departing from the spirit or scope thereof, only such limitations should be imposed as are indicated by the appended claims.

What is claimed is:

1. The process of producing germanium by first concentrating a small quantity of germanium in a ferruginous mineral containing said small quantity of germanium and a predominant quantity of zinc oxide, which comprises retorting said mineral in comminuted form admixed with reducing carbon in comminuted form to distill off the resultant zinc and leave a solid residue in comminuted form, magnetically separating a magnetic fraction of said solid residue containing a major portion of said small quantity of germanium, and recovering from said magnetic fraction germanium as product.

2. The process of claim 1 wherein a minor proportion of finely divided iron oxide is uniformly admixed with said mineral before retorting, said minor proportion of finely divided iron oxide being limited to the extent that said solid residue ultimately has an iron content not exceeding 10% by weight.

3. The process of claim 1 wherein at least a portion of the non-magnetic fraction of said solid residue is admixed with a fresh charge of said mineral in comminuted form prior to said retorting.

4. The process of claim 1 wherein the magnetic fraction is magnetically separated from said solid residue in comminuted form passing through a 20-mesh screen.

5. The process of producing germanium by first concentrating a small quantity of germanium in an oxidic zinc mineral containing said small quantity of germanium, which comprises retorting an admixture of reducing carbon in comminuted form and said mineral in comminuted form to distill off the resultant zinc until a minor quantity of solid mineral residue in comminuted form remains, said retorting being conducted in the presence of iron dispersed substantially uniformly in said mineral in an amount which is only a minor part of said minor quantity of solid mineral residue, magnetically separating from said minor quantity of solid mineral residue a minor magnetic fraction containing a major portion of said small quantity of germanium, and recovering from said magnetic fraction germanium as product.

6. The process of claim 5 wherein the minor magnetic fraction is magnetically separated from said solid mineral residue in comminuted form passing through a 20-mesh screen.

7. The process of claim 5 wherein the minor magnetic fraction is less than one-third of said minor quantity of solid mineral residue.

8. The process of claim 7 wherein at least a portion of the major non-magnetic fraction of said minor quantity of solid mineral residue is admixed with a fresh charge of said mineral in comminuted form prior to said retorting.

References Cited in the file of this patent

UNITED STATES PATENTS

| | | |
|---|---|---|
| 495,550 | Gouyard | Apr. 18, 1893 |
| 1,315,349 | Spitzer et al. | Sept. 9, 1919 |
| 1,751,778 | Girsewald et al. | Mar. 25, 1930 |

FOREIGN PATENTS

| | | |
|---|---|---|
| 277,001 | Great Britain | Aug. 30, 1927 |

OTHER REFERENCES

Chemical Abstracts, vol. 27, page 2117, 1933, "Extraction of Ge from Ge-bearing Spetter-retort Residues"; vol. 26, page 2023, 1932.

Journal of Scientific and Industrial Research (India), vol. 9B, No. 2, pages 52 and 53, 1950, "Germanium in Sphalicite From Nepal."

"Journal of Metals," November 1952, pages 1132 to 1137.

Powell et al.: "Journal of Applied Chemistry," vol. 1, 1951, pages 541–551.